A. C. NEWCOMER.
CULTIVATOR.
APPLICATION FILED SEPT. 3, 1908.
916,184.
Patented Mar. 23, 1909.
3 SHEETS—SHEET 1.
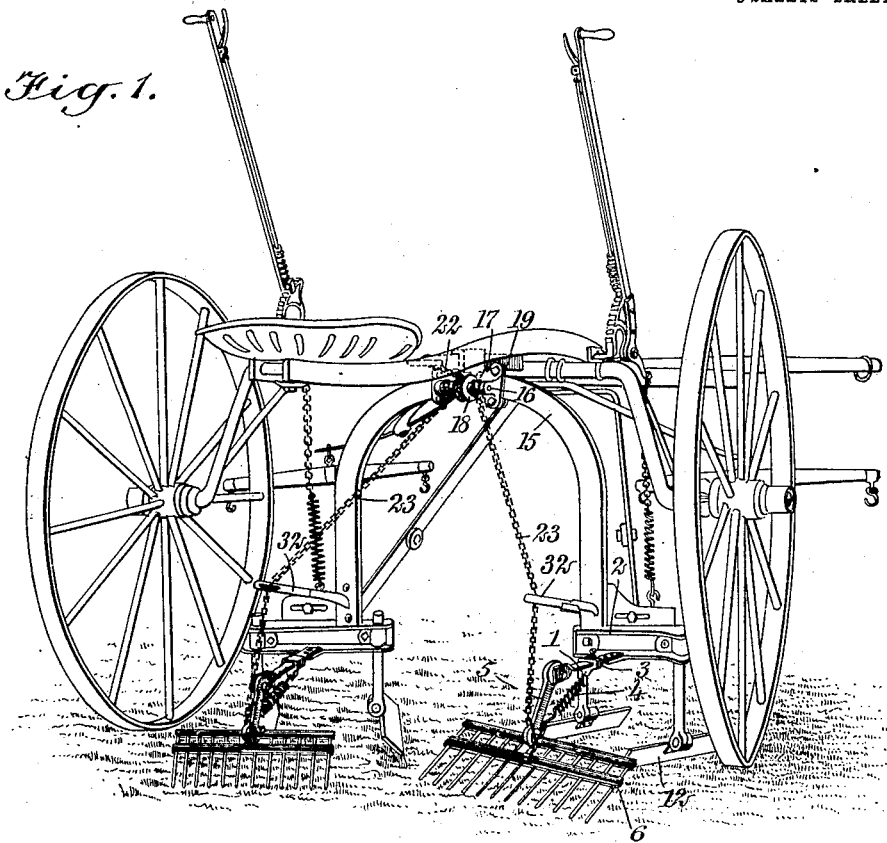
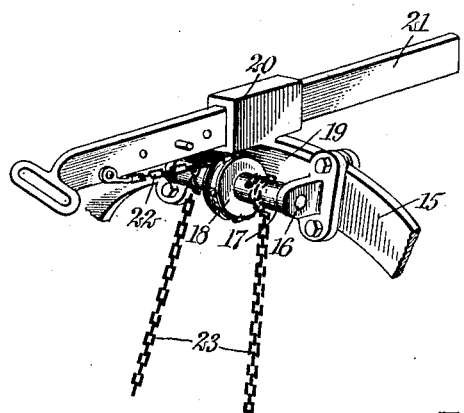
WITNESSES
INVENTOR
Arthur C. Newcomer
BY
ATTORNEYS

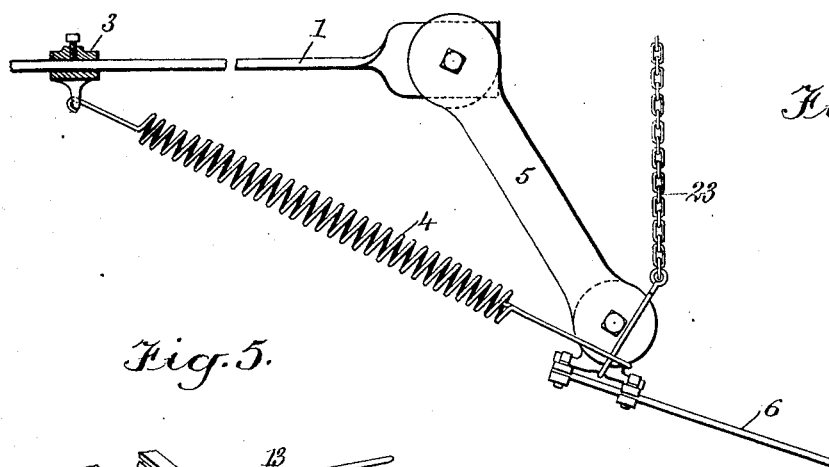
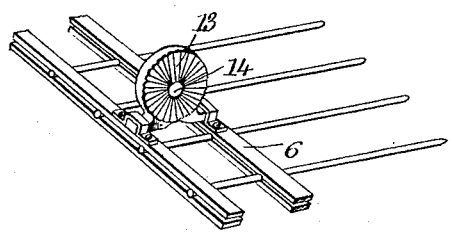
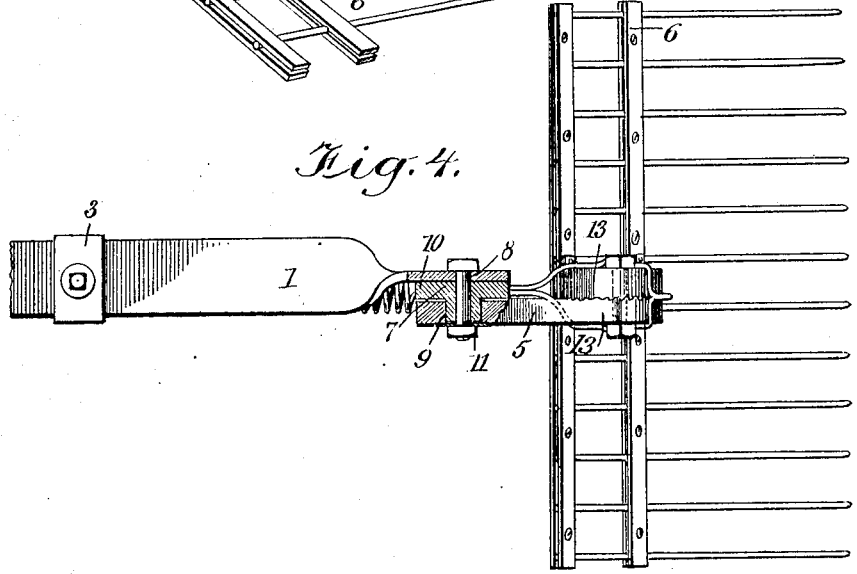

A. C. NEWCOMER.
CULTIVATOR.
APPLICATION FILED SEPT. 3, 1908.
916,184.
Patented Mar. 23, 1909.
3 SHEETS—SHEET 3.
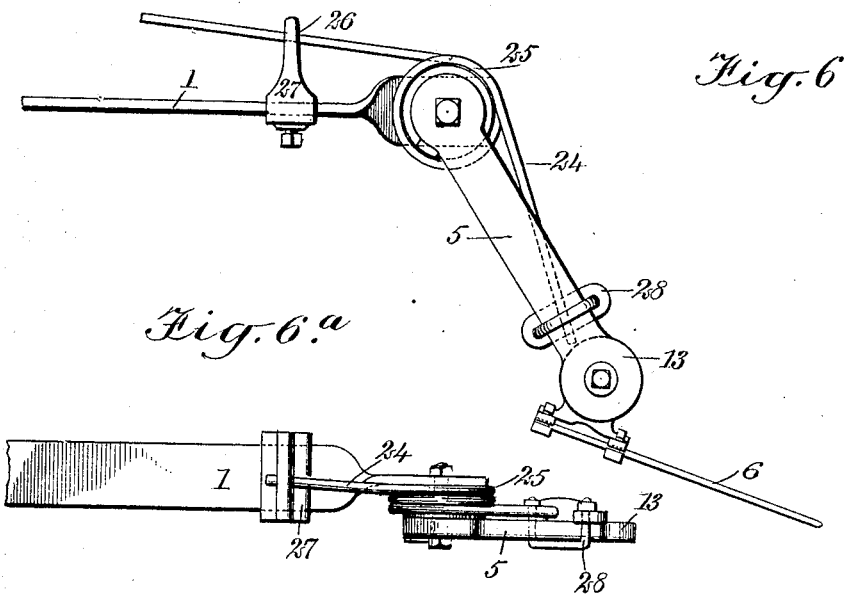
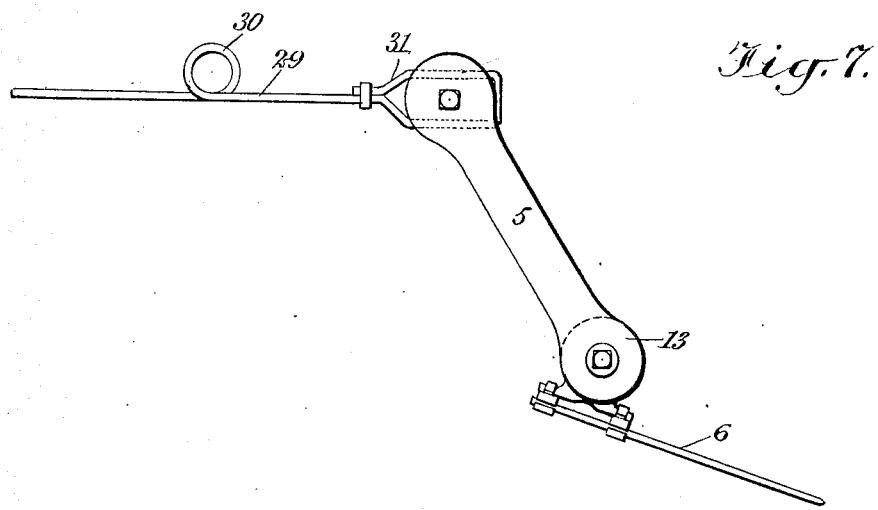
WITNESSES
INVENTOR
Arthur C. Newcomer
BY
ATTORNEYS

UNITED STATES PATENT OFFICE.

ARTHUR C. NEWCOMER, OF NEWBURG, IOWA.

CULTIVATOR.

No. 916,184.  Specification of Letters Patent.  Patented March 23, 1909.

Application filed September 3, 1908. Serial No. 451,533.

*To all whom it may concern:*

Be it known that I, ARTHUR C. NEWCOMER, a citizen of the United States, and a resident of Newburg, in the county of Jasper and State of Iowa, have invented a new and Improved Cultivator, of which the following is a full, clear, and exact description.

My invention relates to cultivators and has for its object to provide an improvement which may be applied to the Tower or other similar cultivators.

The improvement consists of means for adjustably mounting the rake carriers on their supports, a sleeve being provided, the orifice in the sleeve being disposed in alinement with an orifice in the outer terminal of the rake carrier support, the orifice in the terminal of the rake carrier being enlarged to permit the sleeve to be disposed therethrough, there being a disk-like extension on the sleeve which is disposed between the rake carrier support and the rake carrier, a bolt passing through the sleeve, which with washers, is adapted to hold the rake carrier pivoted to its support. A spring is provided which is adapted to hold the rake yieldingly against the ground, there being a drum mounted on a shaft, which is journaled in the frame of the machine, chains being secured to the rakes respectively, the chains being also secured to the shaft, and a chain is secured to a drum secured to the shaft, the other terminal of the chain being secured to a rod disposed in a sleeve secured as a guide.

Other objects of the invention will appear in the following complete description.

In this specification I will describe the preferred forms of my invention, but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a perspective view showing my invention applied to a cultivator of the usual type; Fig. 2 is a perspective view showing the means secured to the arch of the cultivator, by which I am able to lift the rakes; Fig. 3 is an enlarged side elevation of one form of the means for holding the rake yieldingly against the ground; Fig. 4 is a plan view thereof; Fig. 5 is a perspective view showing the means for bolting the rake to the rake carrier at a predetermined angle; Fig. 6 is a side elevation of another form of my invention; Fig. 6$^a$ is a plan view thereof; and Fig. 7 is a side elevation of still another form of the invention.

By referring to the drawings, it will be seen that the cultivator is of the ordinary type, and that my invention consists in the means which I use to permit of the movement of the rakes relatively to the plows, so that when the cultivator is in operation, clods of earth or similar obstructions will raise the rake, without lifting the plows from their proper position to engage the ground.

By the use of the parts which I will now describe, my improvement may be applied to the ordinary type of cultivator, it being only necessary to enlarge the orifice in the rake carrier. When this orifice is enlarged, the additional parts may be assembled in place to produce the desired result.

The horizontal bar 1, which is secured to the frame 2 of the cultivator, is of the ordinary type and no alteration is necessary in order that my improvement may be applied. On this horizontal bar 1, or rake supporter, a sleeve 3 is disposed, to which is secured a spring 4, the other terminal of which is secured to a rake carrier 5, near a rake 6. The rake carrier 5, which is of the ordinary type, is pivoted to the horizontal bar, or rake carrier supporter 1, by the following means. A sleeve 7 is provided, the sleeve 7 having an orifice which is substantially of the same diameter as an orifice 8 in the outer terminal of the horizontal bar or rake handle supporter 1. The orifice in the rake carrier 5 is enlarged as at 9 to permit the sleeve 7 to be disposed therethrough, and the sleeve 7 has a disk-like extension 10 which is disposed between the horizontal bar 1 and the rake carrier 5. A bolt 11 is then disposed through the orifice in the sleeve 7, and by means of washers and a nut the rake carrier 5 is pivoted to the horizontal bar 1. As has been stated, the spring 4 is secured to the sleeve 3 and to the rake carrier 5, near the rake 6. It will, therefore, be seen that the rake 6 will be held yieldingly against the ground and that it will be lifted by any obstruction without interfering with the operation of the plows 12. The angle of the rake 6 relatively to the rake carrier 5 is obtained by means of disks 13, one of which is on the rake, the other being on the rake carrier, the said disks having orifices 14 therethrough and each having one of its faces with teeth therein, the teeth in the two disks being adapted to mesh, so that when they are bolted together with the rake 6 in a predetermined relationship relatively to the rake carrier 5, the rake will be secured in this position. As will be understood by referring to the drawings, there are a plurality of rakes which are disposed back of the plows 12, so that the ground will be raked immediately after it has been cut up by the plows. To an arch 15 of the frame of the cultivator, I bolt flanges 16 in which a shaft 17 is journaled, there being a drum 18 secured to this shaft; and to surfaces 19 by which the flanges 16 are secured to the arch 15, there is secured a sleeve 20, in which is disposed a rod 21, the sleeve 20 acting as a guide for the said rod. To this rod 21 is secured a chain 22, the other terminal of the chain 22 being secured to the drum 18. Chains 23 are secured to the shaft 17 at either side of the drum respectively, the chains 23 passing through guides secured to the foot rests 32 and having their other terminals secured to the rakes 6, respectively. It will, therefore, be seen that by the movement of the bar 21, the rakes 6 may be lifted at the will of the operator, independently of the plow 12.

Another form of my invention is shown in Figs. 6 and 6ª of the drawings, in which the horizontal bar 1 and the rake carrier 5 are pivoted together in the same manner as has been stated with reference to the form of my invention illustrated in Figs. 3 and 4 of the drawings, but the spring is arranged in a different manner, the spring 24 having a coil 25, the coil 25 being disposed on the disk-like extension 10 of the sleeve 7, one terminal of the spring 24 being disposed in an eye 26 in a sleeve 27, which is disposed on the horizontal bar 1, the sleeve 27 having a screw meshed in one of its surfaces, the screw being adapted to press against the horizontal bar 1 to hold the sleeve in a predetermined position relatively thereto. The other terminal of the spring 24 is secured to the rake carrier 5, near the rake 6, by means of a clamp 28.

In still another form of my invention, shown in Fig. 7 of the drawings, a spring 29 is secured to the frame 2 in place of the horizontal bar 1, and to this spring 29, which may have a coil 30 therein, is bolted the rake carrier 5, the spring 29 being adapted to hold the rake carrier 5 with the rake 6 toward the ground. The rake carrier in this form of the invention is of the usual type and a loop 31 in the spring 29 may be secured to the terminal of the rake carrier 5 by means of the sleeve 7, the loop 31 being disposed between the disk-like extension of the sleeve and the rake carrier, a bolt being disposed through the sleeve 7 to press the loop 31 between the disk-like extension of the sleeve and the rake carrier.

In the forms of my invention disclosed in Figs. 6, 6ª and 7 of the drawings, the same method of raising the rakes as illustrated in the form of my invention shown in Figs. 3 and 4 of the drawings, is adapted to be used.

Having thus described my invention, I claim as new and desire to secure by Letters Patent:

1. In a cultivator, a plow, a rake pivoted in the rear of the plow, means for holding the rake yieldingly against the ground, a shaft, a chain secured to the rake, the chain being also secured to the shaft, a drum secured to the shaft, a rod, and a chain secured to the rod and to the drum.

2. In a cultivator, a bar, a rake carrier pivoted thereto, a sleeve mounted to slide on the bar, means for securing the sleeve in a predetermined position on the bar, a rake secured to the rake carrier, and a spring secured to the sleeve and to the rake carrier.

3. In a cultivator, a bar having an orifice in one of its terminals, a sleeve having an orifice in alinement with the orifice in the bar, a rake carrier having an orifice through which the sleeve extends, the sleeve having a disk-like extension which separates the bar from the rake carrier, a bolt disposed in the orifices and the sleeve, a sleeve mounted to slide on the bar, means for securing the sleeve to the bar in a predetermined position, a rake secured to the rake carrier, and a spring secured to the last named sleeve and to the rake carrier.

4. In a cultivator, a bar, a rake carrier, each of which has an orifice therein, a sleeve which extends in one of the orifices, the opening in the sleeve being in alinement with the other orifice, the sleeve having a disk-like-extension which separates the bar from the rake carrier, a bolt disposed in the orifices and the sleeve, a sleeve mounted to slide on the bar, means for securing the sleeve to the bar in a predetermined position, a rake secured to the rake carrier, and a spring secured to the last named sleeve, the spring being adapted to hold the rake yieldingly against the ground.

5. In a cultivator, a bar, a rake carrier, each of which has an orifice therein, a sleeve which extends in one of the orifices, the opening in the sleeve being in alinement with the other orifice, the sleeve having a disk-like extension which separates the bar from the rake carrier, a bolt disposed in the orifices and the sleeve, a rake secured to the rake carrier, a spring secured to the bar, the spring being adapted to hold the rake yieldingly against the ground, a shaft, a chain secured to the rake, the other terminal of the chain being secured to the shaft, and means for rotating the shaft.

6. In a cultivator, a bar, a rake carrier pivoted thereto, a rake secured to the rake carrier, a spring secured to the bar, the spring being adapted for holding the rake yieldingly against the ground, a shaft, a chain secured to the shaft, the chain being adapted to lift the rake from the ground, a drum secured to the shaft, a rod, and a chain secured to the rod and to the drum.

7. In a cultivator, a bar, a rake carrier pivoted thereto, a sleeve mounted to slide on the bar, means for securing the sleeve in a predetermined position on the bar, a rake secured to the rake carrier, a spring secured to the sleeve and to the rake carrier, a shaft, a chain secured to the rake, the other terminal of the chain being secured to the shaft, a drum secured to the shaft, a rod and a chain secured to the rod and to the drum.

8. In a cultivator, a bar, a rake carrier, each of which has an orifice therein, a sleeve which extends in one of the orifices, the opening in the sleeve being in alinement with the other orifice, the sleeve having a disk-like extension which separates the bar from the rake carrier, a bolt disposed in the orifices and the sleeve, and a spring which is wound around the sleeve, one terminal of the spring being secured to the bar, the spring being adapted to hold the rake yieldingly against the ground.

9. In a cultivator, a bar, a rake carrier, each of which has an orifice therein, a sleeve which extends in one of the orifices, the opening in the sleeve being in alinement with the other orifice, the sleeve having a disk-like extension which separates the bar from the rake carrier, a bolt disposed in the orifices and the sleeve, a second sleeve mounted to slide on the bar, means for securing the second sleeve to the bar in a predetermined position, a spring which is wound around the first named sleeve, one terminal of the spring being secured to the last named sleeve, and a clamp by which the other terminal of the spring is secured to the rake carrier.

10. In a cultivator, plows, rake carrier supporters each having an orifice in one of its terminals, sleeves having orifices in alinement with the orifices in the rake carrier supports respectively, rake carriers disposed in the rear of the plows, having orifices through which the sleeves extend respectively, the sleeves each having a disk-like extension which separates the rake carrier supporters from the rake carriers, bolts disposed in the sleeves and in the orifices in the same carrier supporters respectively, sleeves mounted to slide on the rake carrier supporters, means for securing the sleeves to the rake handle supporters in a predetermined position, springs which are wound around the first named sleeves respectively, one terminal of each of the springs being secured to the last named sleeves respectively, clamps by which the other terminals of the springs are secured to the rake carriers respectively, and means for lifting the rake carriers at the will of the operator.

11. In a cultivator, a bar having an orifice in one of its terminals, a sleeve having its orifice in alinement with the orifice in the bar, a rake carrier having an orifice through which the sleeve extends, the sleeve having a disk-like extension which separates the bar from the rake carrier, a bolt disposed in the sleeve and in the orifice in the bar, a second sleeve mounted to slide on the bar, means for securing the second sleeve to the bar in a predetermined position, a spring which is wound around the first named sleeve, one terminal of the spring being secured to the last named sleeve, a clamp by which the other terminal of the spring is secured to the rake carrier, a shaft, a chain secured to the rake, the other terminal of the chain being secured to the shaft, a drum secured to the shaft, a rod, and a chain secured to the rod and to the drum.

In testimony whereof I have signed my name to this specification in the presence of two subscribing witnesses.

ARTHUR C. NEWCOMER.

Witnesses:
C. H. VERHUK,
A. C. HARRIMAN.